3,394,547
BRAKE LOCK
Lester E. Erickson, 320 Medin Road,
Duluth, Minn. 55804
Filed Jan. 13, 1967, Ser. No. 609,157
10 Claims. (Cl. 60—54.5)

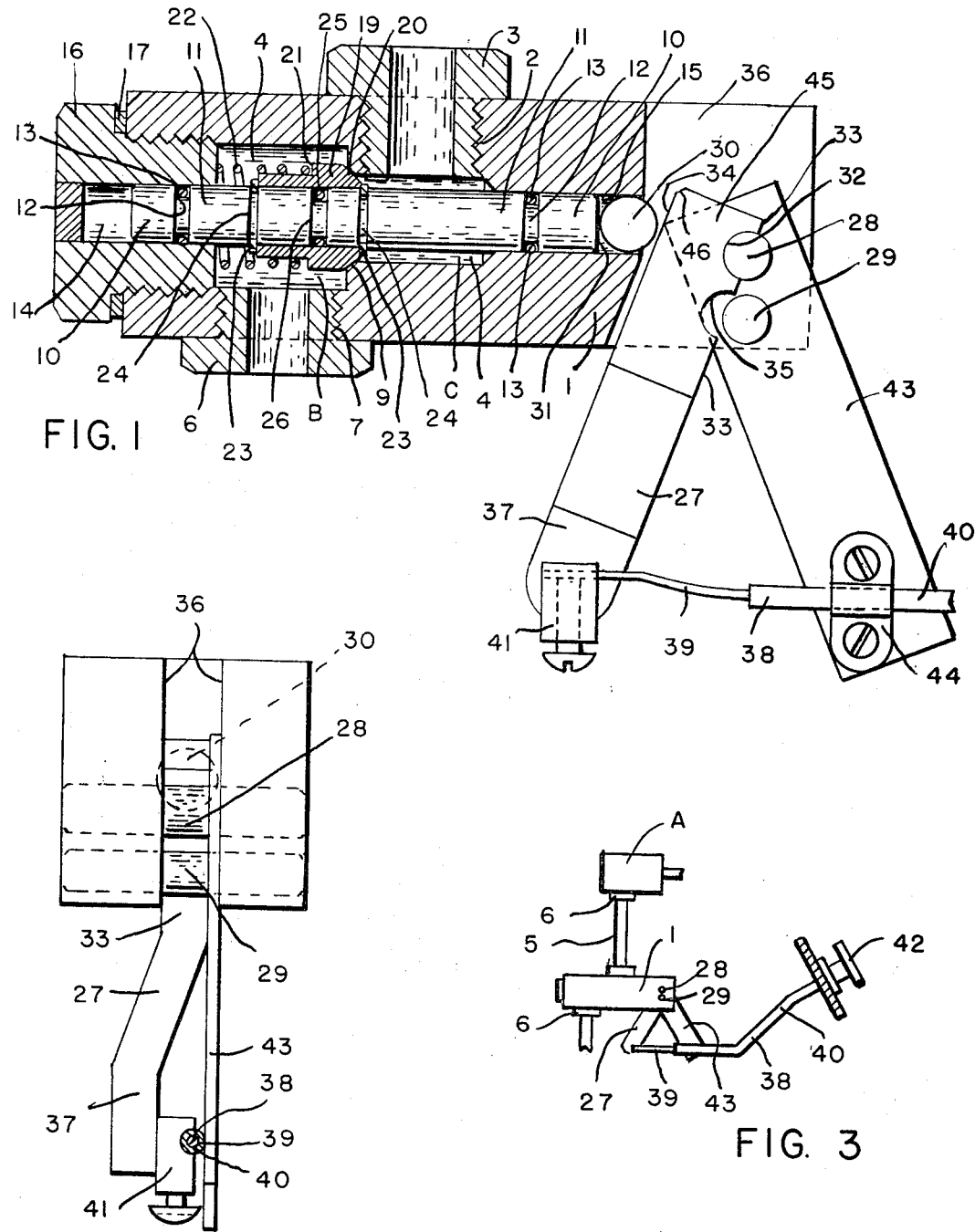

This invention relates to hydraulic brake systems of vehicles, and has special reference to a hydraulic brake lock which will positively maintain the hydraulic braking mechanism of a vehicle in an engaged-locked position to prevent wheel movement.

Conventional vehicles such as automobiles and trucks are equipped with hydraulically operated braking systems which include brake shoes to engage brake drums, and a hydraulic system which is usually controlled by a foot pedal to operate the brakes as desired. An emergency braking system is also provided on vehicles which usually is manually operated and controlled by means of an arrangement of levers and cables. The emergency braking system operating means is independent of the hydraulic system and is a mechanical device. Emergency brake systems usually operate the rear wheel brakes only, or they may operate a brake band arrangement on the vehicle drive shaft. It is well known that emergency braking systems are not equal in braking ability to the hydraulic brake systems of the vehicle. This lesser braking ability in the conventional mechanical emergency braking system is a definite drawback when it is necessary to hold a vehicle on a steep grade, especially if the vehicle is heavily loaded.

It is, therefore, one of the principal objects of this invention to provide an improved emergency or holding brake system for vehicles already equipped with hydraulic brakes.

Another object of this invention is to provide an emergency brake system which operates all the brakes on all of the wheels of the vehicle simultaneously, making for improved safety for vehicles so equipped.

Further objects of this invention are to provide an emergency brake system for vehicles which is simple in construction, and easy to operate and control.

Another object of this invention is to provide an emergency brake system which is inexpensive to manufacture and install on vehicles thereby making it possible for anyone to have a better and safer emergency braking system.

A more specific object of this invention is to provide a simple unit or kit that may be attached to any vehicle having hydraulic brakes to provide an all-wheel hydraulic emergency brake system.

Another specific object is to provide such a unit which will positively maintain the brakes of a vehicle in emergency locked position until the operator manually releases them.

Another specific object of this invention is to provide a brake lock unit which has a positive hydraulic valve seat and seal to prevent leakage of hydraulic fluid which would cause releasing of the emergency brake, and to provide a positive brake release mechanism which will break the said seal easily and quickly by manual operation when it is so desired.

A still more specific object of this invention is to provide a brake lock unit having a positive valve seat seal, and to provide a dual-pivot operative lever arrangement which includes substantial leverage for breaking the initial locking seal and initiating the opening of the valve upon initial movement of the lever and, an automatic shift to a second pivot of lesser leverage which provides for fast movement of the valve away from the valve seat after the valve seal is initially broken, thereby assuring that the vehicle may start moving without brake drag at the moment the vehicle operator intends such movement to take place by operating the brake lock operating lever.

Another object of this invention is to provide an emergency brake lock system which is simple in construction and simple to maintain.

These and other objects and advantages of this invention will become more apparent as the description proceeds.

FIG. 1 is a central sectional view of a brake lock embodying my invention.

FIG. 2 is an end view of my brake lock.

FIG. 3 is a schematic view of a brake lock installation.

In the drawing, the reference numeral 1 indicates the housing of my brake lock which may be fastened to any suitable support on the vehicle, not shown, but preferably close to the master cylinder A of the hydraulic brake system of the vehicle. The housing 1 has a threaded opening 2 to receive a fitting 3 by means of which the brake lock may be operatively connected to the master cylinder A so that all of the hydraulic fluid moved by the operation of the master cylinder is passed into the chamber 4 of the housing 1. The brake lock is connected to the existing master cylinder of a vehicle by first disconnecting the main hydraulic brake fluid line connection 6 from the master cylinder and connecting the brake lock in its place by suitable tubing 5. The connection 6 is then connected to the threaded opening 7 in the housing 1 as shown; thus the brake lock is installed in the main hydraulic brake line of the vehicle, and all fluid acted on by the master cylinder goes through the brake lock.

The chamber 4 in the housing 1 communicates with both the opening 2 and the opening 7, as shown, which provides fluid communication through the brake lock from the master cylinder to the hydraulic brake lines of the vehicle.

The chamber 4 has two major sections B and C; B is a larger chamber and communicates directly with the opening 7 which connects to the hydraulic brake lines of the vehicle, and C is a smaller chamber directly communicating with the opening 2 providing direct communication with the master cylinder of the vehicle. The chambers B and C are axially alined as shown.

Between the chambers B and C a tapered valve seat 9 is provided, as shown. The openings 2 and 7 are offset from each other and the valve seat 9 is between these openings as shown.

Within the housing 1 a plunger or piston 10 is reciprocably carried. The piston 10 includes an elongated body portion 11 which is preferably a round shaft having suitable grooves 12—12 to receive O-rings 13—13 as shown for suitable sealing against oil and pressure leaks. The piston is carried in suitable openings 14 and 15 in the housing which are axially alined with the sections B and C of chamber 4 as shown so that the piston may be moved axially of the chamber 4 and housing in normal operation.

As shown in the drawings, the major chamber section B is closed by means of a threaded plug or closure member 16 which provides the axial opening 14 for the plunger, and is sealed against leakage by gasket 17 as well as by the O-ring 13. This construction will permit the plunger to move axially within the housing.

At the point where chambers B and C meet, a tapered seat 18 is provided. On the plunger 10, an enlarged head portion 19 is provided which has a tapered end of truncated cone shape which is a valve 20 to engage the tapered seat 18 to seal the two chambers B and C from each other when required. The enlarged head portion has a stepped portion 21 at its opposite end to receive one end of a spring 22 which is carried axially on the plunger 10 and has its opposite end engaged against the plug or closure 16. The spring provides bias to keep the plunger in a closed position with the valve 20 against the seat 18.

The valve 20 is preferably made of some durable sealing material such as nylon or the like. As shown in the accompanying drawing, the entire enlarged head 19 may be made of nylon for simplicity of construction, and the head 19 may be held in place by snap rings 23—23 at each end thereof which are held in suitable annular grooves 24—24 in the plunger or piston 10. In this construction it is necessary to provide an O-ring 25 in a groove 26 to seal against oil leakage between chambers B and C between the piston 10 and the head 19.

It should be apparent that if a vehicle were equipped in the manner described with a device constructed in the manner of my invention as it has been thus described, the operation of the brake pedal of such a vehicle would cause all of the brake fluid from the brake system master cylinder to flow through the housing 1 of my device from the opening 2 through the section C of the chamber 4 where the hydraulic pressure would overcome the tension of the spring 22 and cause the valve 20 to move away from the valve seat 18 permitting oil to flow through section B of the chamber 4 and out of the opening 7 into the brake lines of the vehicle to operate the vehicle brakes in accordance with the pressure applied on the said brake pedal.

As soon as pressure on the said brake pedal is released, even slighlty, the spring 22 would immediately react to move the piston 10 in the direction of seat 18 and cause the valve 20 to engage the seat 18 and thereby seal the chamber sections B and C from each other, preventing reverse flow of the fluid which is necessary to release the vehicle brakes. The brakes are thus locked, and will prevent the vehicle from moving.

In order to provide for releasing of the brakes when they are thus locked, and also to render my brake lock inoperative to permit normal vehicular movement. I have provided a manually operated release lever 27 which has two different pivot points 28 and 29, as shown. The point where initial pivoting of the lever 27 occurs is the pivot pin 28 which provides greater leverage than the second pivot pin 29, as will be apparent.

The operating lever 27 engages a suitable piston operating ball 30 which is carried within the axial opening 15 in the housing. The ball 30 in turn engages the end 31 of the piston, as shown to provide a relatively friction-free engagement between the operating lever 27 and the piston 10 during the operation of the lever 27.

The lever 27 is shown as having a semi-circular initial pivot notch 32 in one edge 33 adjacent one end thereof which is engaged against the initial pivot pin 28 when the valve 20 is closed, while the opposite edge of the lever 34 is engaged against the piston operating ball 30.

The lever 27 also has a second semi-circular notch 35 in the edge 33 adjacent to the notch 32 which provides a secondary pivot for the lever 27 in conjunction with the second pivot pin 29. When the valve 20 is in sealed position the second pivot is not in contact with its pivot point or pin 29.

The lever 27 is carried in a groove or slot 36 in the housing 1 in a position to engage the operating ball 30, and the pivot pins extend through the housing 1 transversely of the slot 36 as shown. To provide their desired respective functions, the first or initial pivot pin 28 is relatively closer to the location of the operating ball 30 of the plunger 10 than is the second pivot 29, and the initial pivot notch 32 is further from the end 37 of the lever than is secondary pivot notch 35.

To manually operate the lever 27, a suitable flexible cable 38 is provided which preferably has a reciprocable rod or core member 39 and a stationary housing member 40. The reciprocable rod 39 is secured to the end 37 of the lever 27 by means of any suitable clamps 41, and the housing 40 is secured to any suitable support adjacent to the clamp 41 to permit the reciprocation of the rod 39 for moving the lever when desired by means of an operating knob 42 attached to the operating rod 39 and located within the vehicle, not shown, in easy reach of the driver of the vehicle.

I have shown a cable support or anchor 43 which is an arm extending from the housing 1 to provide an anchor for the cable housing 40, and a clamp 44 to hold the cable housing in place. The cable support 43 may be a simple arm carried in the slot 36 and held in place by means of the pivot pins 28 and 29, as shown, making the slot and the pivot pins perform a dual function, and making for simple and inexpensive construction of my brake lock.

As described above, we have left the brake lock device in locked or sealed position wherein all brakes connected to the housing 1 at connection 7 would be in applied position preventing the vehicle from moving.

To release the brakes of the vehicle, the operating knob 42 must be pulled to move the end 37 of the lever 27 toward the fixed support or arm 43. As the rod 39 is initially moved by pulling the operating knob 42, the lever 27 pivots on the initial pivot 28 and pivot notch 32 and this initial pivot position provides substantial leverage to permit the operator to break the seal between chambers B and C by forcing the valve 20 away from seat 18 and overcoming the hydraulic pressure within chamber B, which acts against the enlarged head 19 of the piston, and also overcoming the bias of the spring 22 which tend to maintain the valve in closed position. The substantial leverage provided by the close-in pivot 28–32 in conjunction with a relatively long lever 27 make it easy to break the seal and start the piston moving to open position.

After the lever has moved a predetermined distance after breaking the seal at valve 20, the secondary pivot notch 35 engages its pivot pin 29, and the piston operating end 45 of the lever 27 moves a greater distance for each increment of movement of the rod 39 by operating knob 42 than when the lever was pivoting on the pivot 28–32, and the valve is rapidly brought to fully open position as the operating lever 27 is moved to fully open position.

The initial pivot gives the power required for initial breaking of the seal of the brake lock, and the secondary pivot provides the speed required for fast operation, once the seal is broken, to bring the piston into a position wherein the valve 20 is fully open.

When the valve 20 is fully open, there is a free channel for brake fluid to flow through the brake lock housing, permitting operation of the vehicle brakes in a normal manner for normal operation of the vehicle. As long as the operating lever is in its fully open position, the vehicle brakes will operate normally.

To use the brake lock, it is only necessary to operate the control knob 42 to move the operating lever to closed position which permits the spring 22 to move the piston in a direction to seat valve 20 on valve seat 18. When the vehicle brake pedal is depressed with the operating lever in closed position, the hydraulic pressure applies in the housing through opening 2 will overcome the tension of the spring 22 and permit the brakes to be applied as holding brakes. The spring will immediately reseat the valve upon the initial release of the vehicle brake pedal and prevent the release of the vehicle brakes until the operating lever is moved to open position.

With this brake lock installed in the hydraulic circuit of a vehicle, it is equipped with a very effective holding brake, and one which operates on all brake equipped wheels connected to the hydraulic circuit.

As a safety feature, to insure that the brake lock is positively inoperative when it is not in use, the edge or corner 46 of the operating lever is designed to go over center or past center of the operating ball 30 and thus positively locking the piston and valve 20 in open position whereby it cannot move to closed position without the operating lever being intentionally operated.

What I claim is:

1. A brake lock for vehicles equipped with a hydraulic brake system including hydraulic brakes for the wheels thereof, a brake operating master cylinder, and fluid lines for connecting said cylinder to said brakes comprising: a housing having a chamber of two sections therein, a valve seat between said sections of said chamber, means for connecting the first one of said sections of said chamber to said cylinder and the second one of said sections to said brakes, a piston reciprocably carried in said housing and extending in said chamber, a valve carried on said piston to engage said seat and provide a fluid seal between said chamber sections when said piston is reciprocated in one direction, means biasing said piston and valve to closed position against said seat, and an operating lever for moving said piston and valve to open position, two separate pivot points for said operating lever, one of said pivot points being an initial pivot which provides greater leverage than the second pivot, and said pivots being spaced apart so that the point of pivot of said lever is automatically transferred from said initial pivot to said second pivot as said lever is moved to open said valve.

2. The structure as set forth in claim 1 and one end of said operating lever being located adjacent to one end of said piston, means for moving the opposite end of said lever to reciprocate said piston in one direction and to permit said piston to be moved in the opposite direction by said biasing means, said two pivots being located adjacent to said one end of said lever, and being of a construction permitting said lever to be pivoted on each of said pivots during predetermined increments of movement as said lever is moved from closed position to open position and back to closed position.

3. The structure as set forth in claim 1 and said two pivot points comprising a pair of spaced pins carried on said housing and two notches formed in one edge of said lever to engage said pins during predetermined increments of movement of said lever.

4. The structure as set forth in claim 2 and a ball member carried between said piston and said one end of said lever to provide a minimum of friction during the operation of said lever.

5. The structure as set forth in claim 1 and said piston having an enlarged head portion within said chamber to provide an area against which hydraulic pressure may act to hold said valve in closed position when hydraulic pressure is greater in the section of said chamber connected to said brakes than it is in the section of said chamber connected to said master cylinder.

6. A brake lock for vehicles equipped with a hydraulic brake system including hydraulic brakes for the wheels thereof, a brake operating master cylinder, and fluid lines for connecting said cylinder to said brakes comprising: a housing having two axially alined chambers therein, one of said chambers being larger than the other, and also having axially alined piston receiving openings therein; means for connecting the smaller one of said chambers to said master cylinder; means for connecting the larger one of said chambers to said brakes; a piston reciprocably carried in said piston receiving openings; sealing means between said piston and said piston receiving openings at each end thereof to seal against fluid leaks; an enlarged head portion on said piston within the larger one of said openings; a valve carried by said head portion; a valve seat on said housing between the said larger and said smaller chambers adapted to cooperate with said valve to seal said chambers from each other; means biasing said piston and valve to closed position against said seat; and an operating lever for moving said piston and valve to open position, two separate pivot points for said operating lever, one of said pivot points being an initial pivot which provides greater leverage than the second pivot, and said pivots being spaced apart so that the point of pivot is automatically transferred from said initial pivot to said second pivot as said lever is moved to open said valve.

7. The structure as set forth in claim 6 and one end of said operating lever being located adjacent to one end of said piston, means for moving the opposite end of said lever to reciprocate said piston in one direction and to permit said piston to be moved in the opposite direction by said biasing means, said two pivots being located adjacent to said one end of said lever, and being of a construction permitting said lever to be pivoted on each of said pivots during predetermined increments of movement as said lever is moved from closed position to open position and back to closed position.

8. The structure as set forth in claim 6 and said two pivot points comprising a pair of spaced pins carried on said housing and two notches formed in one edge of said lever to engage said pins during predetermined increments of movement of said lever.

9. The structure as set forth in claim 7 and a ball member carried between said piston and said one end of said lever to provide a minimum of friction during the operation of said lever.

10. The structure as set forth in claim 6 and said piston having an enlarged head portion within said chamber to provide an area against which hydraulic pressure may act to hold said valve in closed position when hydraulic pressure is greater in the section of said chamber connected to said brakes than it is in the section of said chamber connected to said master cylinder.

References Cited

UNITED STATES PATENTS 3,322,246   5/1967   Noguchi _____ 188—152.15 XR

MARTIN P. SCHWADRON, *Primary Examiner.*

ROBERT R. BUNEVICH, *Assistant Examiner.*